No. 855,449. PATENTED JUNE 4, 1907.
V. DORN.
PROCESS OF AMELIORATING WINES AND SPIRITS AND OF STERILIZING LIQUIDS.
APPLICATION FILED APR. 25, 1904.
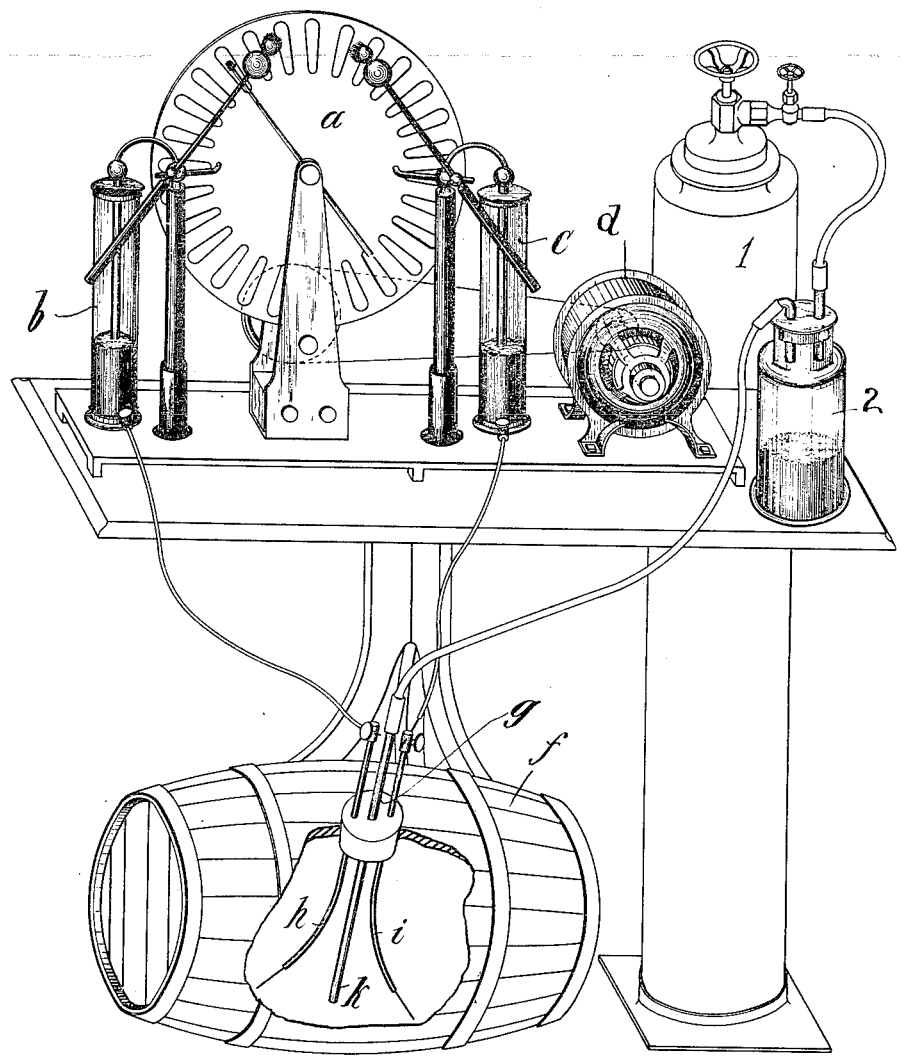
Witnesses
JHM Kuhne
John A. Percival
Inventor
Victor Dorn
By Richard Sr.
ATTORNEYS.

UNITED STATES PATENT OFFICE.

VICTOR DORN, OF WILMERSDORF, NEAR BERLIN, GERMANY.

PROCESS OF AMELIORATING WINES AND SPIRITS AND OF STERILIZING LIQUIDS.

No. 855,449.      Specification of Letters Patent.      Patented June 4, 1907.

Application filed April 25, 1904. Serial No. 204,796.

*To all whom it may concern:*

Be it known that I, VICTOR DORN, apotheker, in the county of Wilmersdorf, near Berlin, Ludwigskirchstr. 11, and Empire of Germany, have invented certain new and useful Improvements in Processes of Ameliorating Wines and Spirits and of Sterilizing Liquids; and I do hereby declare the following to be a full, clear, and exact description of the invention, such as will enable others skilled in the art to which it pertains to make and use it, reference being had to the accompanying drawings, which form part of this specification.

Exhaustive research on the influence of static and of dynamic electricity on those liquids, and substances containing liquids, which are in an unstable, flowing, chemically transitional state (for instance, the products of the alcoholic, lactic and acetic acid fermentation), have shown that there is an essential difference between the action of static and of dynamic electricity. Thus whereas dynamic electricity (both stationary and induced alternating currents) does not exert any influence, or an electrolytic influence which injuriously affects the essential character of the substance in question, static electricity within a very short time causes changes which otherwise the substance only experiences through long storage and aging. This amelioration can be effected in a very short time at most in some hours.

An essential point is that the substances being treated are super-saturated with oxygen and oxygenous mixtures. For the purpose of artificially aging liquids, etc. I may proceed as follows: A Wimshurst influence machine with two or more plates and worked either by hand or by a small motor supplies the necessary quantities of electricity. The latter is led from the conductors by wires to the electrodes, which are insulated from the liquid with the exception of platinum points which form the electrode terminals. The electrodes are immersed in the liquid and the static discharges pass from one to another through the liquid. During the electrical treatment oxygen is continuously conducted in a slow current through the liquid, in such manner that the latter becomes completely saturated with it. Owing to the discharges which take place, the oxygen is partly ozonized, partly ionized, and thus to a large extent rendered active, and since these two conditions of the oxygen come in contact with the liquid *in statu nascendi*, the most favorable conditions possible for cold oxidation are presented.

As shown in the accompanying drawings, as an example, the apparatus employed for carrying out the process consists of an electric induction-machine "*a*" of some known system, beside which are fitted up the two accumulator-jars "*b, c.*" Movement is imparted to the electric machine "*a*" by means of a motor "*d.*" The apparatus "*g*" is suspended in the barrel "*f*" or in the reservoir containing the liquid to be treated. Said apparatus consists of two electrodes "*h, i*" formed of a glass tube and comprising the partly insulated conductors of electricity which end at the bottom in a non-rusting point, for example in a platinum-point. The electrodes "*h, i*" are bent away at the bottom from each other so as to stand off from one another as far as possible in order to establish a large spark-field. A glass-tube "*k*" provided between these electrodes, is either connected with an oxygen-reservoir and purifier 1, 2, or the oxygen is conducted to it. Glass-tube "*k*" extends the same or nearly the same distance into the barrel as the electrode-points and conducts the oxygen between the electrode-points or as far as into their discharge-field. As soon as the electric machine is made to move, the electricity passes over to the electrodes and an equalizing current is formed between the points of the latter. At the same time oxygen is conducted through the tube into the liquid so that the oxygen is influenced by the electric equalizing current.

The amelioration of many liquid substances (such as wines and brandies) as brought about by natural aging is essentially the result of slow oxidation of some of the constituents and of the precipitation of certain difficultly soluble matters (for instance, in the case of red wines of tannin and of a portion of the coloring-principles). Both components of aging, by treatment with static electricity and oxygen, are brought much more rapidly to an issue, while the amelioration is in the same degree as attained by natural aging.

The static discharges fulfil a double purpose; 1. The oxygen is ozonized and ionized, either inside the liquid or in the layer immediately above its surface. 2. The chemical processes within the liquid are essentially accelerated by the inter-molecular shocks effected by the static discharges, both in respect to oxidation and precipitation.

The current of oxygen in addition to causing an oxidizing action by ozone and ionized oxygen *in statu nascendi* also causes agitation of the liquid, so that the entire liquid mass is exposed to the intended treatment.

The action of the static discharges mentioned under (1), render the process of the greatest value also in the destruction of germs and bacteria in liquids which are to be sterilized, as has been proved by numerous experiments with pure cultures, etc. The sterilization takes place rapidly and thoroughly without the essential character of the substance being altered.

The exclusive employment of static electricity, in order to obviate the undesirable and injurious secondary actions of dynamic electricity, may be carried out by means either of stationary, or induction currents.

As an example of the method of carrying out my process I may state the following case from practice:—Into the bung-hole of a hectoliter barrel of new red-wine containing a large amount of tannin (a mixture of equal parts of Moselle with Italian claret or Barletta) a current of oxygen was continuously conducted by means of a thin pipe, while two insulated wires, the ends of which terminated in non-insulated, short platinum points, were likewise, at a distance of about 10 centimeters apart, conducted into the barrel. By means of the platinum points as electrodes, the static discharges of the Leyden jars of a frictional electric machine of Wimshurst's construction were produced. At intervals of ten minutes samples were taken from the barrel. The first sample (after 10 minutes) showed no perceptible change. After 20 minutes the wine tasted essentially mellower. After 30 minutes there was a weak precipitation of tannin; and after 40 minutes the wine had attained its finest condition. The color had become somewhat lighter. The wine treated was bottled and at intervals of a fortnight, compared with untreated samples of the same wine. The comparison showed that the treated wine had precisely the character of wine aged in the bottle.

I have likewise successfully employed my process in the sterilization of liquids, for killing the germs of the pure-cultures of tubercule bacilli, suppuration bacteria (streptococci) yeast-fungus and the like.

Having thus described my invention, what I claim as new and desire to secure by Letters Patent is:

The process of sterilizing and aging liquids consisting in saturating the liquid with oxygen and simultaneously passing an electric spark through said liquid.

In witness whereof I have hereunto signed my name this 2nd day of April 1904, in the presence of two subscribing witnesses.

VICTOR DORN.

Witnesses:
WOLDEMAR HAUPT,
HENRY HASPER.